US012614752B2

(12) United States Patent (10) Patent No.: US 12,614,752 B2
Hirano et al. (45) **Date of Patent: \*Apr. 28, 2026**

(54) SOLID ELECTROLYTE COMPOSITION, METHOD FOR PRODUCING SOLID ELECTROLYTE COMPOSITION, AND METHOD FOR PRODUCING SOLID ELECTROLYTE MEMBER

(71) Applicant: Panasonic Intellectual Property Management Co., Ltd., Osaka (JP)

(72) Inventors: Koichi Hirano, Osaka (JP); Yusuke Nishio, Osaka (JP); Kazufumi Miyatake, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 586 days.

This patent is subject to a terminal disclaimer.

(21) Appl. No.: 17/842,546

(22) Filed: Jun. 16, 2022

(65) Prior Publication Data

US 2022/0320571 A1    Oct. 6, 2022

Related U.S. Application Data

(63) Continuation of application No. PCT/JP2020/045914, filed on Dec. 9, 2020.

(30) Foreign Application Priority Data

Dec. 27, 2019    (JP) ................................. 2019-238466

(51) Int. Cl.
$H01M\ 10/056$      (2010.01)
$H01M\ 4/13915$      (2010.01)
$H01M\ 10/0562$      (2010.01)

(52) U.S. Cl.
CPC ..... *H01M 10/056* (2013.01); *H01M 4/13915* (2013.01); *H01M 10/0562* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 10,547,055 B2 * | 1/2020 | Matsuda | H01M 4/366 |
| 11,404,718 B2 * | 8/2022 | Sakai | H01B 1/06 |
| 11,524,902 B2 * | 12/2022 | Asano | H01M 4/525 |
| 11,605,833 B2 * | 3/2023 | Isojima | H01M 10/056 |
| 11,637,315 B2 * | 4/2023 | Ouspenski | H01M 10/0562 429/322 |
| 11,848,414 B2 * | 12/2023 | Assat | H01M 10/0562 |
| 12,132,171 B2 * | 10/2024 | Isojima | H01M 4/139 |
| 12,288,844 B2 | 4/2025 | Kubo et al. | |
| 12,308,384 B2 * | 5/2025 | Assat | H01M 10/0562 |
| 12,451,513 B2 * | 10/2025 | Nishio | H01M 10/0562 |
| 12,525,642 B2 * | 1/2026 | Nakama | H01M 10/0562 |

| | | | |
|---|---|---|---|
| 2009/0081554 A1 | 3/2009 | Takada et al. | |
| 2011/0027551 A1 | 2/2011 | Huang et al. | |
| 2011/0027661 A1 | 2/2011 | Okazaki et al. | |
| 2011/0057151 A1 | 3/2011 | Chen et al. | |
| 2014/0087270 A1 | 3/2014 | Yoshida | |
| 2016/0268661 A1 * | 9/2016 | Kim | H01M 10/0568 |
| 2018/0090752 A1 | 3/2018 | Fujiki et al. | |
| 2019/0088949 A1 * | 3/2019 | Makino | H01M 10/0585 |
| 2019/0088995 A1 * | 3/2019 | Asano | H01M 10/052 |
| 2019/0386322 A1 | 12/2019 | Yawata et al. | |
| 2020/0119362 A1 * | 4/2020 | Furusawa | H01M 4/668 |
| 2020/0127325 A1 * | 4/2020 | Takahashi | H01M 4/133 |
| 2020/0144575 A1 | 5/2020 | Ku et al. | |
| 2020/0184253 A1 | 6/2020 | Butscher et al. | |
| 2020/0328453 A1 | 10/2020 | Sakai et al. | |
| 2020/0328459 A1 | 10/2020 | Sakai et al. | |
| 2020/0328460 A1 | 10/2020 | Asano et al. | |
| 2020/0343554 A1 | 10/2020 | Oshima et al. | |
| 2020/0350615 A1 * | 11/2020 | Sakaida | H01M 4/13 |
| 2020/0350626 A1 | 11/2020 | Matsumura et al. | |
| 2021/0218054 A1 | 7/2021 | Oshima et al. | |
| 2021/0273259 A1 | 9/2021 | Nagamine et al. | |
| 2021/0328262 A1 * | 10/2021 | Nishio | H01M 10/0525 |
| 2021/0376377 A1 * | 12/2021 | Tanaka | H01M 10/0525 |
| 2022/0209291 A1 | 6/2022 | Kubo et al. | |
| 2022/0246983 A1 * | 8/2022 | Suzuki | H01B 1/06 |
| 2022/0255125 A1 * | 8/2022 | Suzuki | H01M 10/0525 |
| 2022/0285721 A1 * | 9/2022 | Miyatake | H01B 1/22 |
| 2022/0294008 A1 * | 9/2022 | Kambara | C03C 4/18 |
| 2022/0294012 A1 * | 9/2022 | Nishio | H01M 10/052 |

(Continued)

FOREIGN PATENT DOCUMENTS

| | | | | |
|---|---|---|---|---|
| CN | 109873207 A | 6/2019 | | |
| CN | 111201643 A | 5/2020 | | |
| CN | 112771626 A | 5/2021 | | |
| EP | 3467845 A1 | 4/2019 | | |
| EP | 4044291 A1 | 8/2022 | | |
| EP | 4084120 A1 | 11/2022 | | |
| EP | 4102594 A1 | 12/2022 | | |
| EP | 3745504 B1 * | 7/2023 | | H01M 4/366 |
| JP | 2016-139511 A | 8/2016 | | |
| WO | 2007/004590 A1 | 1/2007 | | |
| WO | WO-2015144074 A1 * | 10/2015 | | C04B 35/447 |
| WO | WO-2018025582 A1 * | 2/2018 | | C01F 17/36 |

(Continued)

OTHER PUBLICATIONS

Zevgolis et al. (App. Phys. Let. Mat., Nov. 2017, all pages) (Year: 2017).*

(Continued)

*Primary Examiner* — Kevin M Bernatz

(74) *Attorney, Agent, or Firm* — Rimon P.C.

(57) ABSTRACT

A solid electrolyte composition of the present disclosure includes: a solid electrolyte material having ion-binding properties; and an organic solvent. The organic solvent includes: a halogen-group-containing compound; and at least one selected from the group consisting of an ether-group-containing compound and a hydrocarbon.

13 Claims, 3 Drawing Sheets

(56)                    References Cited

U.S. PATENT DOCUMENTS

| | | | |
|---|---|---|---|
| 2022/0320571 A1 | 10/2022 | Hirano et al. | |
| 2022/0367845 A1 | 11/2022 | Sasaki et al. | |
| 2023/0163299 A1 | 5/2023 | Nagamine et al. | |
| 2024/0413385 A1* | 12/2024 | Ueno | H01B 1/06 |
| 2026/0024806 A1* | 1/2026 | Nishio | H01M 10/0562 |

FOREIGN PATENT DOCUMENTS

| | | | | |
|---|---|---|---|---|
| WO | 2018/168505 A1 | 9/2018 | | |
| WO | 2019/135315 A1 | 7/2019 | | |
| WO | 2019/135319 A1 | 7/2019 | | |
| WO | 2019/135343 A1 | 7/2019 | | |
| WO | 2019/146218 A1 | 8/2019 | | |
| WO | 2019/146236 A1 | 8/2019 | | |
| WO | WO-2019146308 A1 * | 8/2019 | | H01B 1/06 |
| WO | 2020/100465 A1 | 5/2020 | | |
| WO | 2020/137026 A1 | 7/2020 | | |
| WO | 2020/137189 A1 | 7/2020 | | |
| WO | 2020/137391 A1 | 7/2020 | | |
| WO | 2021/070595 A1 | 4/2021 | | |
| WO | 2021/131716 A1 | 7/2021 | | |
| WO | 2021/157361 A1 | 8/2021 | | |

OTHER PUBLICATIONS

Abstract Translation of WO-2019-146218-A1 (Year: 2019).*
WO-2015144074-A1 Merged file (Abstract and published patent file) (Year: 2015).*
Abstract Translation of WO-2019146308-A1 (Year: 2019).*
Extended European Search Report dated May 27, 2024 issued in the corresponding European Patent Application No. 20906558.0.
Chinese Search Report dated Jun. 28, 2024 issued in the corresponding Chinese Patent Application No. 202080088589.9, with English translation.
International Search Report issued on Mar. 9, 2021 in International Patent Application No. PCT/JP2020/045914, with English translation.
International Search Report of PCT application No. PCT/JP2021/025293 dated Aug. 24, 2021.
International Search Report of PCT application No. PCT/JP2021/025292 dated Aug. 31, 2021.
International Search Report of PCT application No. PCT/JP2022/027342 dated Sep. 27, 2022.
The EPC Office Action dated Jul. 3, 2024 for the related European Patent Application No. EP21846770.2.
The EPC Office Action dated Jul. 3, 2024 for the related European Patent Application No. 21845968.3.
The EPC Office Action dated Sep. 9, 2025 for the related European Patent Application No. 22864061.1.
Masahiro Tatsumisago et al., "All-solid-state lithium secondary batteries using sulfide-based glass-ceramic electrolytes", Journal of Power Sources 159 (2006), May 24, 2006, pp. 193-199.
Atsushi Sakuda et al., "Interfacial Observation between LiCoO2 Electrode and Li2S-P2S5 Solid Electrolytes of All-Solid-State Lithium Secondary Batteries Using Transmission Electron Microscopy", Chemistry of Materials, American Chemical Society, 2010, vol. 22, No. 3, Sep. 25, 2009, pp. 949-956.
Non-Final Office Action dated Jul. 23, 2025 issued in U.S. Appl. No. 18/153,364.
Non-Final Office Action dated Jul. 23, 2025 issued in U.S. Appl. No. 18/153,354.
Non-Final Office Action dated Aug. 7, 2025 issued in U.S. Appl. No. 18/153,354.
Non-Final Office Action dated Nov. 26, 2025 issued in U.S. Appl. No. 18/153,354.
Non-Final Office Action dated Aug. 7, 2025 issued in U.S. Appl. No. 18/444,615.
Final Office Action dated Dec. 3, 2025 issued in U.S. Appl. No. 18/444,615.
Notice of Allowance dated Dec. 9, 2025 issued in U.S. Appl. No. 18/153,364.
Non-Final Office Action dated Dec. 29, 2025 issued in related U.S. Appl. No. 18/153,364.
Notice of Allowance dated Feb. 11, 2026 issued in related U.S. Appl. No. 18/444,615.
Search Report dated Jan. 13, 2026 for the corresponding Chinese Patent Application No. 202180061394.X, with English translation.

* cited by examiner

SOLID ELECTROLYTE COMPOSITION, METHOD FOR PRODUCING SOLID ELECTROLYTE COMPOSITION, AND METHOD FOR PRODUCING SOLID ELECTROLYTE MEMBER

This application is a continuation of PCT/JP2020/045914 filed on Dec. 9, 2020, which claims foreign priority of Japanese Patent Application No. 2019-238466 filed on Dec. 27, 2019, the entire contents of both of which are incorporated herein by reference.

BACKGROUND OF THE INVENTION

1. Field of the Invention

The present disclosure relates to a solid electrolyte composition used, for example, for producing all-solid-state batteries, a method for producing a solid electrolyte composition, and a method for producing a solid electrolyte member.

2. Description of Related Art

WO 2018/168505 discloses a solid electrolyte composition using a sulfide solid electrolyte.

WO 2018/168505 discloses a battery using a halide solid electrolyte material.

SUMMARY OF THE INVENTION

In conventional techniques, there has been a desire for a solid electrolyte composition having an excellent dispersion stability.

One aspect of the present disclosure relates to a solid electrolyte composition including:

a solid electrolyte material having ion-binding properties; and an organic solvent, wherein the organic solvent includes:

a halogen-group-containing compound; and at least one selected from the group consisting of an ether-group-containing compound and a hydrocarbon.

Another aspect of the present disclosure relates to a method for producing a solid electrolyte member, the method including removing the organic solvent from the above solid electrolyte composition.

According to the present disclosure, it is possible to provide a solid electrolyte composition having an excellent dispersion stability.

DETAILED DESCRIPTION

Figure 1:
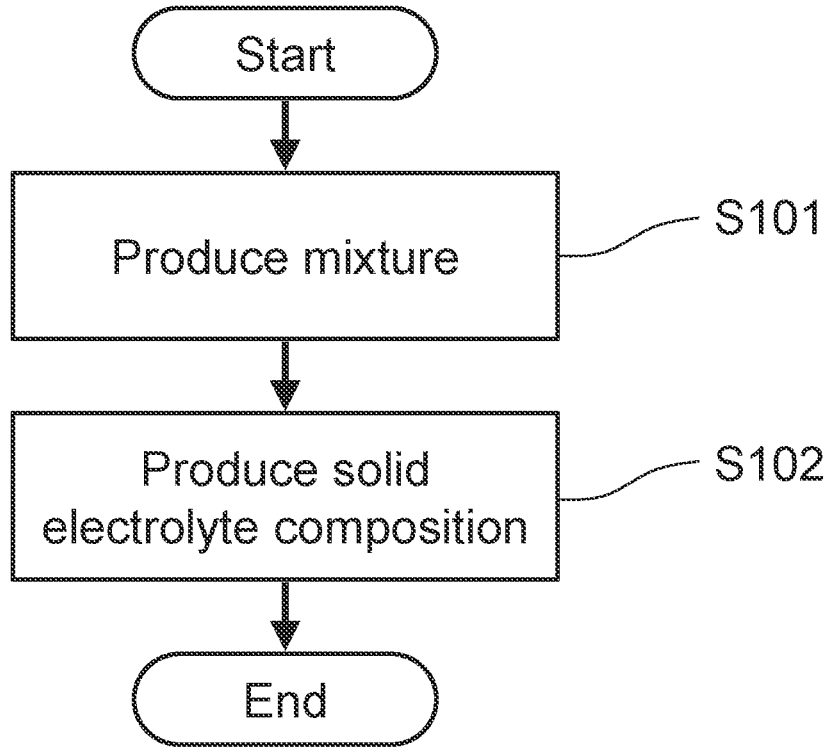
FIG. 1 is a flowchart showing an exemplary method for producing a solid electrolyte composition.

Outline of One Aspect of the Present Disclosure

A solid electrolyte composition according to a first aspect of the present disclosure includes:

a solid electrolyte material having ion-binding properties; and an organic solvent, wherein the organic solvent includes:

a halogen-group-containing compound; and at least one selected from the group consisting of an ether-group-containing compound and a hydrocarbon.

According to the first aspect, it is possible to provide a solid electrolyte composition having an excellent dispersion stability.

In a second aspect of the present disclosure, for example, in the solid electrolyte composition according to the first aspect, the solid electrolyte material may be free of a sulfur element. With such a structure, it is possible to provide a solid electrolyte composition having an excellent dispersion stability.

In a third aspect of the present disclosure, for example, the solid electrolyte composition according to the first or second aspect may further include an organic binder. By using the organic binder, it is possible to improve the binding properties between solid electrolyte materials, the binding properties between a solid electrolyte and an electrode, or the binding properties between the solid electrolyte and a current collector.

In a fourth aspect of the present disclosure, for example, in the solid electrolyte composition according to any one of the first to third aspects, the solid electrolyte material may have lithium ion conductivity, and the solid electrolyte material may include: at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one selected from the group consisting of F, Cl, Br, and I.

In a fifth aspect of the present disclosure, for example, in the solid electrolyte composition according to any one of the first to third aspects, the solid electrolyte material may include: Li; at least one selected from the group consisting of Gd, Ca, Zr, and Y; and at least one selected from the group consisting of F, Cl, Br, and I.

In a sixth aspect of the present disclosure, for example, in the solid electrolyte composition according to any one of the first to third aspects, the solid electrolyte material may include: Li; Y; and at least one selected from the group consisting of F, Cl, Br, and I.

In a seventh aspect of the present disclosure, for example, in the solid electrolyte composition according to the fifth aspect, the solid electrolyte material may include at least one selected from the group consisting of a material including Li, Y, Cl, and Br, a material including Li, Ca, Y, Gd, Cl, and Br, and a material including Li, Zr, Y, and Cl.

In an eighth aspect of the present disclosure, for example, in the solid electrolyte composition according to the seventh aspect, the solid electrolyte material may include at least one selected from the group consisting of $Li_3YBr_2Cl_4$, $Li_{2.8}Ca_{0.1}Y_{0.5}Gd_{0.5}Br_2Cl_4$, and $Li_{2.5}Y_{0.5}Zr_{0.5}Cl_6$.

According to the fourth to eighth aspects, an all-solid-state battery can exhibit an excellent charge and discharge efficiency.

In a ninth aspect of the present disclosure, for example, in the solid electrolyte composition according to any one of the first to fourth aspect, the solid electrolyte material may consist substantially of: Li; at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one selected from the group consisting of F, Cl, Br, and I. With such a structure, it is possible to produce a solid electrolyte member having a high lithium ion conductivity.

In a tenth aspect of the present disclosure, for example, in the solid electrolyte composition according to any one of the first to ninth aspects, a ratio of a weight of the halogen-group-containing compound to a total weight of the organic solvent may be 10 weight % or more. With such a structure, it is possible to provide a solid electrolyte composition having an excellent dispersion stability.

In an eleventh aspect of the present disclosure, for example, in the solid electrolyte composition according to any one of the first to tenth aspects, the organic solvent may have a cyclic structure.

In a twelfth aspect of the present disclosure, for example, in the solid electrolyte composition according to the eleventh aspect, the organic solvent may include an aromatic compound.

According to the eleventh and twelfth aspects, the solid electrolyte material having ion-binding properties can be easily dispersed in the organic solvent.

In a thirteenth aspect of the present disclosure, for example, in the solid electrolyte composition according to any one of the first to tenth aspects, the halogen-group-containing compound may include at least one selected from the group consisting of 1,2,4-trichlorobenzene, chlorobenzene, 2,4-dichlorotoluene, o-chlorotoluene, 1,3-dichlorobenzene, p-chlorotoluene, 1,2-dichlorobenzene, 1,4-dichlorobutane, and 3,4-dichlorotoluene.

In a fourteenth aspect of the present disclosure, for example, in the solid electrolyte composition according to any one of the first to tenth aspects, the at least one selected from the group consisting of the ether-group-containing compound and the hydrocarbon may include at least one selected from the group consisting of tetralin, ethylbenzene, mesitylene, pseudocumene, xylene, cumene, dibutyl ether, and anisole.

According to the thirteenth and fourteenth aspects, the solid electrolyte material having ion-binding properties can be easily dispersed in the organic solvent.

In a fifteen aspect of the present disclosure, for example, the solid electrolyte composition according to any one of the first to fourteenth aspects may further include an active material. Because of including the active material, the solid electrolyte composition can have an excellent dispersion stability.

A method for producing a solid electrolyte composition according to a sixteenth aspect of the present disclosure includes mixing a solid electrolyte material having ion-binding properties, a first organic solvent including a halogen-group-containing compound, and a second organic solvent including at least one selected from the group consisting of an ether-group-containing compound and a hydrocarbon.

According to the sixteenth aspect, it is possible to improve the fluidity of the solid electrolyte composition while maintaining the dispersibility and the stability of the solid electrolyte material.

In a seventeenth aspect of the present disclosure, for example, in the method for producing a solid electrolyte composition according to the sixteenth aspect, a mixture including the solid electrolyte material and the first organic solvent may be prepared, and then the mixture and the second organic solvent may be mixed.

In an eighteenth aspect of the present disclosure, for example, in the method for producing a solid electrolyte composition according to the sixteenth aspect, in mixing the solid electrolyte material, the first organic solvent, and the second organic solvent, an organic binder may be mixed with the solid electrolyte material, the first organic solvent, and the second organic solvent.

In a nineteenth aspect of the present disclosure, for example, in the method for producing a solid electrolyte composition according to the seventeenth aspect, in mixing the mixture and the second organic solvent, the second organic solvent and an organic binder may be mixed to prepare an organic binder solution, and the mixture and the organic binder solution may be mixed.

According to the seventeenth to nineteenth aspects, it is possible to improve the fluidity of the solid electrolyte composition while maintaining the dispersibility and the stability of the solid electrolyte material.

In a twentieth aspect of the present disclosure, for example, in the method for producing a solid electrolyte composition according to any one of the sixteenth to nineteenth aspects, at least one selected from the group consisting of a halogen-group-containing compound, an ether-group-containing compound, and a hydrocarbon may be further mixed into a solid electrolyte composition obtained from the solid electrolyte material, the first organic solvent, and the second organic solvent. With such a structure, the solid electrolyte composition can have an appropriate viscosity while maintaining the dispersibility and the stability of the solid electrolyte material.

A method for producing a solid electrolyte member according to a twenty-first aspect of the present disclosure includes removing the organic solvent from the solid electrolyte composition according to any one of the first to fifteenth aspects.

According to the twenty-first aspect, a homogeneous solid electrolyte membrane can be produced.

Embodiments of the present disclosure will be described with reference to the drawings.

<Inventors' Viewpoint>

In the field of secondary batteries for which a higher energy density and a higher capacity are needed, organic electrolyte solutions, in which an electrolyte salt is dissolved in an organic solvent, have been used conventionally and predominantly. In secondary batteries using organic electrolyte solutions, liquid leakage is a concern, and a possible increase in amount of heat generated in case of a short circuit or the like is also pointed out.

Meanwhile, all-solid-state secondary batteries using an inorganic solid electrolyte instead of an organic electrolyte solution are increasingly drawing attention. All-solid-state secondary batteries cause no liquid leakage. Since inorganic solid electrolytes are nonflammable, heat generation in case of a short circuit or the like is expected to be suppressed.

As inorganic solid electrolytes used for all-solid-state secondary batteries, sulfide solid electrolytes including sulfur as a main component and oxide solid electrolytes including a metal oxide as a main component are known. However, sulfide solid electrolytes might generate toxic hydrogen sulfide when reacting with moisture. Oxide solid electrolytes have a low ionic conductivity. For these reasons, the development of a novel solid electrolyte material having an excellent ionic conductivity is desired.

As a novel solid electrolyte material, for example, WO 2018/025582 discloses a solid electrolyte material including a lithium element, an yttrium element, and at least one halogen element.

For the practical use of an all-solid-state secondary battery using a solid electrolyte material having ion-binding properties, it is required to prepare a fluid composition including a solid electrolyte material having ion-binding properties. Furthermore, a technique is required for applying a fluid composition to the surface of an electrode or a current collector thus to form a solid electrolyte member.

To prepare a fluid composition, a solid electrolyte material having ion-binding properties needs to be mixed with an organic solvent. However, when an organic solvent is mixed with a solid electrolyte material having ion-binding properties, the solid electrolyte material having ion-binding properties might have a decreased lithium ion conductivity depending on the type of organic solvent. Alternatively, when an organic solvent is mixed with a solid electrolyte material having ion-binding properties, the solid electrolyte material having ion-binding properties might have a decreased dispersion stability depending on the type of organic solvent.

From the above viewpoint, the structure of the present disclosure was achieved.

According to the present disclosure, it is possible to suppress coagulation or sedimentation of a solid electrolyte material. Consequently, it is possible to provide a solid electrolyte composition having an excellent dispersion stability. Furthermore, such a solid electrolyte composition can suppress a decrease in ionic conductivity.

Embodiment 1

In Embodiment 1, a solid electrolyte composition includes a solid electrolyte material having ion-binding properties and an organic solvent.

The solid electrolyte material having ion-binding properties is not particularly limited as long as it is a solid electrolyte material that has ion-binding properties and has ionic conductivity. In general, a bond between atoms having a large difference in electronegativity is called an ionic bond. For example, metal elements have a low electronegativity whereas nonmetal elements have a high electronegativity. A solid electrolyte material having ion-binding properties can be for example a solid electrolyte material having a bond between a metal element other than a lithium element and a nonmetal element. A solid electrolyte material having ion-binding properties is for example free of a sulfur element.

The organic solvent includes a halogen-group-containing compound and at least one selected from the group consisting of an ether-group-containing compound and a hydrocarbon. With such a structure, the solid electrolyte material having ion-binding properties can be easily dispersed in the organic solvent, and the viscosity of the solid electrolyte composition can be appropriately adjusted. For example, owing to the organic solvent including a halogen-group-containing compound, the solid electrolyte material having ion-binding properties can be easily dispersed, and thus a solid electrolyte composition with an excellent dispersibility can be obtained. For example, owing to the organic solvent including at least one selected from the group consisting of an ether-group-containing compound and a hydrocarbon, the interaction between the solid electrolyte materials having ion-binding properties can be appropriately adjusted. Consequently, the viscosity of the solid electrolyte composition can be appropriately adjusted.

The halogen-group-containing compound may consist of carbon and hydrogen in a portion other than the halogen group. In other words, the halogen-group-containing compound may be a compound in which at least one of hydrogen atoms included in a hydrocarbon is substituted with a halogen group. Examples of the halogen group include F, Cl, Br, and I. As the halogen group, at least one or at least two selected from the group consisting of F, Cl, Br, and I may be used. From the viewpoint of boiling point or drying properties, the halogen group may be a choro group. The halogen-group-containing compound can have a high polarity. Using the halogen-group-containing compound allows the solid electrolyte material having ion-binding properties to be easily dispersed, and thus a solid electrolyte composition with an excellent dispersibility can be obtained. Consequently, the solid electrolyte composition can form a solid electrolyte member that has an excellent lithium ion conductivity and is denser.

The number of carbons included in the halogen-group-containing compound is not particularly limited, and may be seven or more. This makes the halogen-group-containing compound to be less likely to volatilize, and thus a solid electrolyte composition can be stably produced. In addition, the halogen-group-containing compound can have a large molecular weight. In other words, the halogen-group-containing compound can have a high boiling point.

The halogen-group-containing compound may have a cyclic structure. The halogen-group-containing compound may have an aromatic ring. The cyclic structure may be an alicyclic hydrocarbon, or may be an aromatic hydrocarbon. The cyclic structure may be monocyclic, or may be polycyclic. Since the halogen-group-containing compound has the cyclic structure, the solid electrolyte material having ion-binding properties can be easily dispersed in the halogen-group-containing compound. These compounds can easily disperse especially a halide solid electrolyte material. The halogen-group-containing compound may include an aromatic hydrocarbon. The halogen-group-containing compound may be an aromatic compound.

The halogen-group-containing compound may contain only a halogen group as a functional group. In this case, the number of halogens included in the halogen-group-containing compound is not particularly limited. As the halogen, at least one or at least two selected from the group consisting of F, Cl, Br, and I may be used. Using such a compound allows a solid electrolyte material having ion-binding properties of the solid electrolyte composition to be easily dispersed. This allows to obtain a solid electrolyte composition with an excellent suspension stability of a solid electrolyte material. Consequently, the solid electrolyte composition can form a solid electrolyte member that has an excellent lithium ion conductivity and is denser. Using such a compound allows the solid electrolyte composition to easily form for example a dense solid electrolyte membrane having reduced pinholes, irregularities, and the like.

As described above, the halogen-group-containing compound may be a compound in which at least one of hydrogen atoms included in a hydrocarbon is substituted with a halogen group. In other words, the halogen-group-containing compound may be a halogenated hydrocarbon. The halogen-group-containing compound may be a compound in which all hydrogen atoms included in a hydrocarbon are substituted with halogen atoms. Using a halogenated hydrocarbon allows the solid electrolyte material having ion-binding properties of the solid electrolyte composition to be easily dispersed. This allows to obtain a solid electrolyte composition with an excellent suspension stability of a solid electrolyte material. Consequently, the solid electrolyte composition can form a solid electrolyte member that has an excellent lithium ion conductivity and is denser. Using the halogenated hydrocarbon allows the solid electrolyte composition to easily form for example a dense solid electrolyte membrane having reduced pinholes, irregularities, and the like.

The hydrocarbon is a compound consisting of carbon and hydrogen. The hydrocarbon may be a saturated hydrocarbon, or may be an unsaturated hydrocarbon. The hydrocarbon may be linear, or may be branched. The number of carbons included in the hydrocarbon is not particularly limited, and may be seven or more.

The hydrocarbon may have a cyclic structure. The hydrocarbon may have an aromatic ring. The cyclic structure may be an alicyclic hydrocarbon, or may be an aromatic hydrocarbon. The cyclic structure may be monocyclic, or may be polycyclic. Since the hydrocarbon has the cyclic structure, the solid electrolyte material having ion-binding properties can be easily dispersed in an organic solvent. These compounds can easily disperse especially a halide solid electrolyte material. From the viewpoint of enhancing the suspension stability of the solid electrolyte material having ion-binding properties in the solid electrolyte composition, the hydrocarbon may include an aromatic hydrocarbon. The hydrocarbon may be an aromatic hydrocarbon.

The ether-group-containing compound may consist of carbon and hydrogen in a portion other than the ether group. In other words, the ether-group-containing compound may be a hydrocarbon including an ether bond. In this case, the hydrocarbon may be a saturated hydrocarbon, or may be an unsaturated hydrocarbon. The hydrocarbon may be linear, or may be branched. The number of carbons included in the hydrocarbon is not particularly limited, and may be seven or more.

The ether-group-containing compound may have a cyclic structure. In other words, a hydrocarbon group contained in the ether-group-containing compound may have a cyclic structure. The ether-group-containing compound may have an aromatic ring. The cyclic structure may be an alicyclic hydrocarbon, or may be an aromatic hydrocarbon. The cyclic structure may be monocyclic, or may be polycyclic. Since the hydrocarbon has the cyclic structure, the solid electrolyte material having ion-binding properties can be easily dispersed in an organic solvent. These compounds can easily disperse especially a halide solid electrolyte material. From the viewpoint of enhancing the suspension stability of the solid electrolyte material having ion-binding properties in the solid electrolyte composition, the hydrocarbon group may include an aromatic hydrocarbon. The hydrocarbon group may be an aromatic hydrocarbon.

From the viewpoint of enhancing the suspension stability of a solid electrolyte material having ion-binding properties, the organic solvent may have a cyclic structure. The organic solvent may include an aromatic compound.

The halogen-group-containing compound may include, more specifically, at least one selected from the group consisting of 1,2,4-trichlorobenzene, chlorobenzene, 2,4-dichlorotoluene, o-chlorotoluene, 1,3-dichlorobenzene, p-chlorotoluene, 1,2-dichlorobenzene, 1,4-dichlorobutane, and 3,4-dichlorotoluene. These compounds can easily disperse a solid electrolyte material having ion-binding properties. These compounds can easily disperse especially a halide solid electrolyte material.

The halogen-group-containing compound may include p-chlorotoluene. The halogen-group-containing compound may be p-chlorotoluene. These compounds can easily disperse a solid electrolyte material having ion-binding properties. These compounds can easily disperse especially a halide solid electrolyte material.

At least one selected from the group consisting of an ether-group-containing compound and hydrocarbon may include, more specifically, at least one selected from the group consisting of tetralin, ethylbenzene, mesitylene, pseudocumene, xylene, cumene, dibutyl ether, and anisole. These compounds can easily disperse a solid electrolyte material having ion-binding properties. These compounds can easily disperse especially a halide solid electrolyte material. In addition, using these compounds allows the solid electrolyte composition to have an appropriate viscosity.

The at least one selected from the group consisting of an ether-group-containing compound and a hydrocarbon may include, more specifically, at least one selected from the group consisting of tetralin, xylene, cumene, and anisole. The at least one selected from the group consisting of an ether-group-containing compound and a hydrocarbon may be the at least one selected from the group consisting of tetralin, xylene, cumene, and anisole. These compounds can easily disperse a solid electrolyte material having ion-binding properties. These compounds can easily disperse especially a halide solid electrolyte material.

The ratio of the weight of the halogen-group-containing compound to the total weight of the organic solvent included in the solid electrolyte composition may be 10 weight % or more, or may be 50 weight % or more. This allows to obtain a solid electrolyte composition with an excellent suspension stability of a solid electrolyte material. The upper limit value of the ratio of the weight of the halogen-group-containing compound to the total weight of the organic solvent included in the solid electrolyte composition is not particularly limited. The upper limit value of the ratio of the weight of the halogen-group-containing compound to the total weight of the organic solvent included in the solid electrolyte composition may be 99 weight %. To calculate the ratio of the weight of the halogen-group-containing compound to the total weight of the organic solvent included in the solid electrolyte composition, a gas chromatograph-mass spectrometer (GC-MS) can be for example used.

The boiling point of the organic solvent is not particularly limited, and may be 100° C. or more, 130° C. or more, or 200° C. or more. The upper limit value of the boiling point of the organic solvent is not particularly limited. The upper limit value of the boiling point of the organic solvent may be 250° C. The organic solvent only needs to be a liquid in which a solid electrolyte material having ion-binding properties can be dispersed, and the solid electrolyte material having ion-binding properties does not need to be completely dissolved in the organic solvent.

With the above structure, it is possible to obtain a solid electrolyte composition with an excellent suspension stability of a solid electrolyte material while suppressing a decrease in ionic conductivity. In other words, in the case where the solid electrolyte composition which includes a solid electrolyte material having ion-binding properties and an organic solvent is dried to remove the organic solvent, a solid electrolyte member having a high ionic conductivity can be obtained. The solid electrolyte member may be a solid electrolyte membrane or an active material membrane.

The solid electrolyte material having ion-binding properties for example can have lithium ion conductivity.

The solid electrolyte material having ion-binding properties may include, for example, at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm. These elements can form a cation in water.

The solid electrolyte material having ion-binding properties may further include at least one selected from the group consisting of F, Cl, Br, and I. These elements can form an anion in water.

The solid electrolyte material having ion-binding properties may include: Li; at least one selected from the group consisting of Gd, Ca, Zr, and Y; and at least one selected from the group consisting of F, Cl, Br, and I.

The solid electrolyte material having ion-binding properties may include: Li; Y; and at least one selected from the group consisting of F, Cl, Br, and I.

With the above structure, the solid electrolyte composition can further suppress a decrease in lithium ion conductivity. This allows to produce a solid electrolyte member having a higher lithium ion conductivity.

The solid electrolyte material having ion-binding properties may include, more specifically, at least one selected from the group consisting of a material including Li, Y, Cl, and Br, a material including Li, Ca, Y, Gd, Cl, and Br, and a material including Li, Zr, Y, and Cl. The solid electrolyte material having ion-binding properties may be a material including Li, Y, Cl, and Br, a material including Li, Ca, Y, Gd, Cl, and Br, or a material including Li, Zr, Y, and Cl.

Specifically, the solid electrolyte material having ion-binding properties may include at least one selected from the group consisting of $Li_3YBr_2Cl_4$, $Li_{2.8}Ca_{0.1}Y_{0.5}Gd_{0.5}Br_2Cl_4$, and $Li_{2.5}Y_{0.5}Zr_{0.5}Cl_6$. The solid electrolyte material having ion-binding properties may be $Li_3YBr_2Cl_4$, $Li_{2.8}Ca_{0.1}Y_{0.5}Gd_{0.5}Br_2Cl_4$, or $Li_{2.5}Y_{0.5}Zr_{0.5}Cl_6$. These solid electrolyte materials having ion-binding properties have a high ionic conductivity. Using these solid electrolyte materials having ion-binding properties allows an all-solid-state battery to exhibit an excellent charge and discharge efficiency.

The solid electrolyte material having ion-binding properties may be a material consisting substantially of: Li; at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one selected from the group consisting of F, Cl, Br, and I. With such a structure, the solid electrolyte composition can further suppress a decrease in lithium ion conductivity. This allows to produce a solid electrolyte member more reliably having an excellent lithium ion conductivity.

In the present disclosure, the phrase "consist substantially of: Li; at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one selected from the group consisting of F, Cl, Br, and I" means to "include only: Li; at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm; and at least one selected from the group consisting of F, Cl, Br, and I, except for inevitable impurities and the like that are unintentionally incorporated". Accordingly, for example, the phrase "consist substantially of Li, Y, Cl, and Br" means to "include only Li, Y, Cl, and Br, except for inevitable impurities and the like that are unintentionally incorporated". Hereinafter, the similar phrases have the similar meaning. Exemplary inevitable impurities include oxygen element.

The solid electrolyte material having ion-binding properties may be a material consisting substantially of Li, Y, Cl, and Br. The solid electrolyte material having ion-binding properties may be a material consisting substantially of Li, Ca, Y, Gd, Cl and Br. The solid electrolyte material having ion-binding properties may be a material consisting substantially of Li, Zr, Y, and Cl.

The solid electrolyte material having ion-binding properties may be a halide solid electrolyte material. In the present disclosure, the term "halide solid electrolyte material" means a solid electrolyte material containing a halogen element and being free of sulfur. Furthermore, in the present disclosure, the term sulfur-free solid electrolyte material means a solid electrolyte material represented by a composition formula including no sulfur element. Accordingly, a solid electrolyte material containing an extremely minute amount of a sulfur component, for example, 0.1 mass % or less of sulfur, is included in sulfur-free solid electrolyte materials. The halide solid electrolyte material may further include oxygen as an anion other than a halogen element.

The halide solid electrolyte material may be represented by the following composition formula (1). In the composition formula (1), α, β, and γ are each independently a value greater than 0. M is at least one selected from the group consisting of metal elements other than Li and metalloid elements. X is at least one selected from the group consisting of Cl, Br, and I. The halide solid electrolyte material represented by the composition formula (1) has a high ionic conductivity. Using the halide solid electrolyte material allows to an all-solid-state battery to exhibit an excellent charge and discharge efficiency.

$$Li_\alpha M_\beta X_\gamma \tag{1}$$

The term "metalloid element" in the present disclosure means at least one selected from the group consisting of B, Si, Ge, As, Sb, and Te.

The term "metal elements" in the present disclosure include all the elements in Group 1 to Group 12 of the periodic table excluding hydrogen and all the elements in Group 13 to Group 16 of the periodic table excluding B, Si, Ge, As, Sb, Te, C, N, P, O, S, and Se. In other words, the "metalloid elements" or "metal elements" are a group of elements that can become cations when forming an inorganic compound with a halogen element.

In the composition formula (1), M may include Y (yttrium). In other words, the halide solid electrolyte material may include Y as the metal element M. The halide solid electrolyte material has a high ionic conductivity. Using the halide solid electrolyte material allows an all-solid-state battery to exhibit an excellent charge and discharge efficiency.

The halide solid electrolyte material including Y may be a compound represented by a compositional formula of $Li_a Me_b Y_c X_6$ where a+mb+3c=6 and c>0 are satisfied. Me is at least one selected from the group consisting of metal elements other than Li and Y and metalloid elements, and m is the valence of Me.

Me is for example at least one selected from the group consisting of Mg, Ca, Sr, Ba, Zn, Sc, Al, Ga, Bi, Zr, Hf, Ti, Sn, Ta, and Nb. In this case, it is possible to further improve the ionic conductivity of the halide solid electrolyte material.

The halide solid electrolyte material may be a material represented by the following composition formula (A1).

$$Li_{6-3d}Y_d X_6 \tag{A1}$$

In the composition formula (A1), X is at least one selected from the group consisting of Cl, Br, and I. In the composition formula (A1), d may satisfy 0<d<2.

In the composition formula (A1), d may satisfy d=1. In other words, the halide solid electrolyte material may be a material represented by a composition formula (A2).

$$Li_3 Y X_6 \tag{A2}$$

The halide solid electrolyte material may be a material represented by a composition formula (A3).

$$Li_{3-3\delta}Y_{1+\delta}Cl_6 \quad (A3)$$

In the composition formula (A3), $\delta$ may satisfy $0<\delta\leq0.15$.

The halide solid electrolyte material may be a material represented by a composition formula (A4).

$$Li_{3-3\delta}Y_{1+\delta}Br_6 \quad (A4)$$

In the composition formula (A4), $\delta$ may satisfy $0<\delta\leq0.25$.

The halide solid electrolyte material may be a material represented by a composition formula (A5).

$$Li_{3-3\delta+a}Y_{1+\delta-a}Me_aCl_{6-x-y}Br_xI_y \quad (A5)$$

In the composition formula (A5), Me may be at least one selected from the group consisting of Mg, Ca, Sr, Ba, and Zn. In the composition formula (A5), $-1<\delta<2$, $0<a<3$, $0<(3-3\delta+a)$, $0<(1+\delta-a)$, $0\leq x\leq6$, $0\leq y\leq6$, and $(x+y)\leq6$ are satisfied.

The halide solid electrolyte material may be a material represented by a composition formula (A6).

$$Li_{3-3\delta}Y_{1+\delta-a}Me_aCl_{6-x-y}Br_xI_y \quad (A6)$$

In the composition formula (A6), Me may be at least one selected from the group consisting of Al, Sc, Ga, and Bi. In the composition formula (A6), $-1<\delta<1$, $0<a<2$, $0<(1+\delta-a)$, $0\leq x\leq6$, $0\leq y\leq6$, and $(x+y)\leq6$ are satisfied.

The halide solid electrolyte material may be a material represented by a composition formula (A7).

$$Li_{3-3\delta-a}Y_{1+\delta-a}Me_aCl_{6-x-y}Br_xI_y \quad (A7)$$

In the composition formula (A7), Me may be at least one selected from the group consisting of Zr, Hf, and Ti. In the composition formula (A7), $-1<\delta<1$, $0<a<1.5$, $0<(3-3\delta-a)$, $0<(1+\delta-a)$, $0\leq x\leq6$, $0\leq y\leq6$, and $(x+y)\leq6$ are satisfied.

The halide solid electrolyte material may be a material represented by a composition formula (A8).

$$Li_{3-3\delta-2a}Y_{1+\delta-a}Me_aCl_{6-x-y}Br_xI_y \quad (A8)$$

In the composition formula (A8), Me may be at least one selected from the group consisting of Ta and Nb. In the composition formula (A8), $-1<\delta<1$, $0<a<1.2$, $0<(3-3\bar{o}-2a)$, $0<(1+\bar{o}-a)$, $0\leq x\leq6$, $0\leq y\leq6$, and $(x+y)\leq6$ are satisfied.

The halide solid electrolyte materials represented by the composition formulas (A1) to (A8) have a high ionic conductivity. All-solid-state batteries using the halide solid electrolyte materials represented by the composition formulas (A1) to (A8) can exhibit an excellent charge and discharge efficiency.

The shape of the solid electrolyte material having ion-binding properties is not particularly limited, and may be particulate. The average particle diameter of the solid electrolyte material having ion-binding properties is not particularly limited, and may be 0.1 μm or more and 2 μm or less, or may be 0.1 μm or more and 1 μm or less. With such a structure, when the solid electrolyte composition is applied to form a solid electrolyte member, the surface roughness of the film can be reduced. This allows formation of a thin film.

In the present disclosure, the average particle diameter of particles means the particle diameter at a cumulative volume of 50% (d50), determined from a volumetric particle size distribution by a laser diffraction scattering method. The particle size distribution can also be measured for example with an image analysis apparatus. The same applies to other materials.

The solid electrolyte composition may further include an organic binder. By including an organic binder, it is possible to improve the binding properties between solid electrolyte materials, the binding properties between a solid electrolyte and an electrode, or the binding properties between the solid electrolyte and a current collector.

The solid electrolyte composition includes an organic solvent. The organic solvent includes a halogen-group-containing compound and at least one selected from the group consisting of an ether-group-containing compound and a hydrocarbon. Accordingly, even when a solid electrolyte composition further includes an organic binder, a solid electrolyte composition with an excellent suspension stability of a solid electrolyte material can be obtained.

The material of the organic binder is not particularly limited, and a material commonly used as a binder for batteries can be used. Examples of the organic binder include thermoplastic resins, rubbers, and styrene butadiene elastomers. Examples of the thermoplastic resins include acrylic resins, urethane resins, imide resins, amide resins, urea resins, and fluororesins. Examples of the rubbers include styrene butadiene rubbers, butylene rubbers, and isoprene rubbers.

The solid electrolyte composition may further include an active material. The active material may be a positive electrode active material. The positive electrode active material is capable of reversibly intercalating and deintercalating lithium ions. Examples which can used as the positive electrode active material include $LiCoO_2$ (lithium cobalt oxide, LCO), $LiNi_2O_2$ (lithium nickel oxide), $LiNi_{0.85}Co_{0.1}Al_{0.05}O_2$ (lithium nickel cobalt aluminum oxide, NCA), $LiNi_{0.5}Co_{0.2}Mn_{0.3}O_2$ (lithium nickel manganese cobalt oxide, NMC), $LiNi_{0.5}Mn_{0.5}O_2$ (lithium manganese nickel oxide), and $LiMn_2O_4$ (lithium manganese oxide, LMO).

The shape of the active material is not particularly limited, and may be particulate. The average particle diameter of the active material is not particularly limited, and may for example be 0.1 μm or more and 30 μm or less. The content of the active material contained in the solid electrolyte composition is not particularly limited. The ratio of the content of the active material to the content of the solids included in the solid electrolyte composition may be 30 weight % or more and 95 weight % or less, or 50 weight % or more and 85 weight % or less. With such a structure, a solid electrolyte member formed on a current collector can exhibit an excellent charge and discharge efficiency as a positive electrode.

Embodiment 2

Embodiment 2 will be described below. The same description as that of the above Embodiment 1 will be omitted appropriately. FIG. 1 is a flowchart showing an exemplary method for producing a solid electrolyte composition.

The method for producing a solid electrolyte composition for example includes mixing a solid electrolyte material having ion-binding properties and an organic solvent. The organic solvent for example includes a first organic solvent and a second organic solvent. The first organic solvent for example includes a halogen-group-containing compound. The second organic solvent for example includes at least one selected from the group consisting of an ether-group-containing compound and a hydrocarbon. In the solid electrolyte composition, the content of the solid electrolyte material having ion-binding properties, the content of the first organic solvent, and the content of the second organic solvent are not particularly limited. The ratio of the weight of the first organic solvent to the weight of the solid electrolyte material having ion-binding properties may be 6.5 weight % or more and 560 weight % or less, or 23 weight % or more and 230 weight % or less. The ratio of the weight of the second organic solvent to the weight of the solid electrolyte material having ion-binding properties may be 0.67 weight % or more and 510 weight % or less, or 2.3 weight % or more and 210 weight % or less. This allows the solid electrolyte material having ion-binding properties to be easily dispersed, and thus a solid electrolyte composition with an excellent suspension stability of a solid electrolyte material can be obtained. Consequently, the solid electrolyte composition can form a solid electrolyte member that has an excellent lithium ion conductivity and is denser. Using such a compound allows the solid electrolyte composition to easily form for example a dense solid electrolyte membrane having reduced pinholes, irregularities, and the like.

The method for producing a solid electrolyte composition may include Step S101 and Step S102. Step S101 is a step of mixing the solid electrolyte material having ion-binding properties according to the above Embodiment 1 and the first organic solvent including a halogen-group-containing compound. Step S102 is a step of mixing the second organic solvent including at least one selected from the group consisting of an ether-group-containing compound and a hydrocarbon. Step S101 and Step S102 may be performed in this order.

By mixing the solid electrolyte material having ion-binding properties and the first organic solvent including a halogen-group-containing compound, a mixture can be obtained. The mixture includes the solid electrolyte material having ion-binding properties and the first organic solvent including a halogen-group-containing compound. The mixture can have excellent dispersibility and stability. By mixing the mixture and the second organic solvent including at least one selected from the group consisting of an ether-group-containing compound and a hydrocarbon, a solid electrolyte composition can be obtained. According to such a method, it is possible to improve the fluidity of the solid electrolyte composition while maintaining the dispersibility and the stability of the solid electrolyte material. According to such a method, a homogeneous solid electrolyte membrane can be produced and a denser solid electrolyte member can be formed.

The method for mixing the solid electrolyte material having ion-binding properties and the first organic solvent including a halogen-group-containing compound is not particularly limited. The solid electrolyte material having ion-binding properties only needs to be homogeneously dispersed in the first organic solvent. Examples which can be used for mixing include a ball mill, a bead mill, a planetary mixer, an ultrasonic mixer, a homogenizer, and a planetary centrifugal mixer.

Embodiment 3

Figure 2:
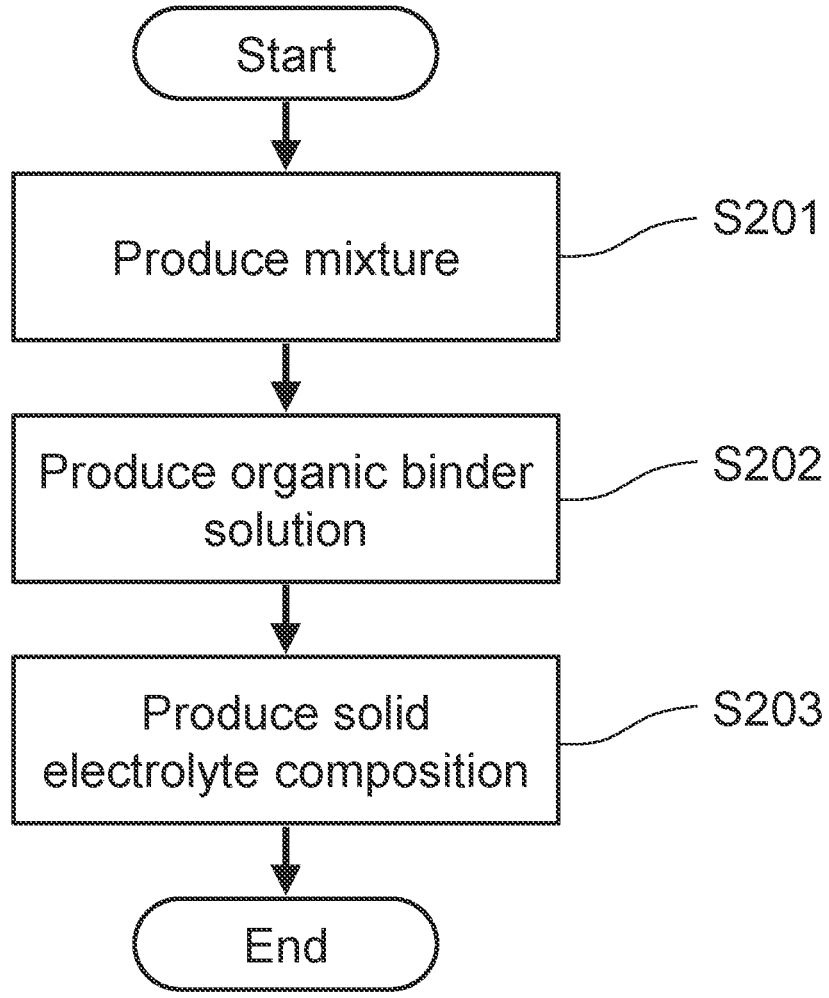
FIG. 2 is a flowchart showing another exemplary method for producing a solid electrolyte composition.

Embodiment 3 will be described below. The same description as those of the above Embodiments 1 and 2 will be omitted appropriately. FIG. 2 is a flowchart showing another exemplary method for producing a solid electrolyte composition.

The method for producing a solid electrolyte composition for example includes mixing a solid electrolyte material having ion-binding properties, an organic solvent, and an organic binder. The organic solvent for example includes a first organic solvent and a second organic solvent. The first organic solvent for example includes a halogen-group-containing compound. The second organic solvent for example includes at least one selected from the group consisting of an ether-group-containing compound and a hydrocarbon. In the case where the solid electrolyte composition includes an organic binder, the content of the solid electrolyte material having ion-binding properties, the content of the first organic solvent, the content of the second organic solvent, and the content of the organic binder are not particularly limited. The ratio of the weight of the first organic solvent to the weight of the solid electrolyte material having ion-binding properties may be 6.5 weight % or more and 560 weight % or less, or 23 weight % or more and 230 weight % or less. The ratio of the weight of the second organic solvent to the weight of the solid electrolyte material having ion-binding properties may be 0.67 weight % or more and 510 weight % or less, or 2.3 weight % or more and 210 weight % or less. The ratio of the weight of the organic binder to the weight of the solid electrolyte material having ion-binding properties may be 0.2 weight % or more and 5 weight % or less, or 0.4 weight % or more and 3 weight % or less. This allows the solid electrolyte material having ion-binding properties of the solid electrolyte composition to be easily dispersed. Thus, a solid electrolyte composition with an excellent suspension stability of a solid electrolyte material can be obtained. Consequently, the solid electrolyte composition can form a solid electrolyte member that has an excellent lithium ion conductivity and is denser. Using such a compound allows the solid electrolyte composition to easily form for example a dense solid electrolyte membrane having reduced pinholes, irregularities, and the like.

The method for producing a solid electrolyte composition may include Step S201, Step S202, and Step S203. Step S201 is a step of preparing a mixture of a solid electrolyte having ion-binding properties and the first organic solvent including a halogen-group-containing compound. Step S202 is a step of mixing an organic binder and the second organic solvent including at least one selected from the group consisting of an ether-group-containing compound and a hydrocarbon to prepare an organic binder solution. Step S203 is a step of mixing the mixture and the organic binder solution. Step S201, Step S202, and Step S203 may be performed in this order.

By mixing the solid electrolyte having ion-binding properties and the first organic solvent including a halogen-group-containing compound, it is possible to produce a mixture having excellent dispersibility and stability. By mixing the mixture and the organic binder solution, it is possible to improve the fluidity of the solid electrolyte composition while maintaining the dispersibility and the stability of the solid electrolyte material. According to such a method, it is possible to obtain a solid electrolyte composition in which an organic binder is homogeneously mixed.

In the case where only the organic binder is added to the mixture, or in the case where the mixture is mixed with the organic binder and the first organic solvent including a halogen-group-containing compound, the viscosity of the mixed solution increases. This decreases the dispersion stability of the solid electrolyte material, and decreases the formability of the solid electrolyte member. In the present disclosure, the organic binder solution, which is obtained by mixing the organic binder and the second organic solvent, is added to the mixture. Accordingly, it possible to improve the fluidity of the solid electrolyte composition while maintaining the dispersibility and the stability of the solid electrolyte material. Furthermore, it is possible to obtain a solid electrolyte composition in which an organic binder is homogeneously mixed.

The step of preparing the mixture can employ the similar method to that in the above Embodiment 2.

In the step of preparing the organic binder solution, to facilitate dissolution of the organic binder, the organic binder solution may be further heated. The heating temperature is not particularly limited, and can be determined in consideration of the boiling point of the organic solvent or the solubility of the organic binder. The heating temperature may be 40° C. or more and 100° C. or less.

Into the solid electrolyte composition, at least one selected from the group consisting of a halogen-group-containing compound, an ether-group-containing compound, and a hydrocarbon may be further mixed. Accordingly, the solid electrolyte composition can have an appropriate viscosity while maintaining the dispersibility and the stability of the solid electrolyte material. Consequently, the solid electrolyte composition is excellent in formability, and thus can form, for example, a coating film having a uniform thickness.

Embodiment 4

Figure 3:
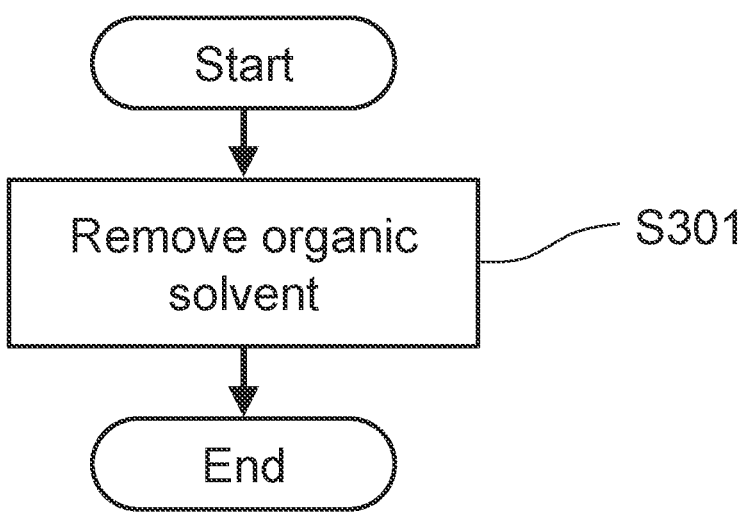
FIG. 3 is a flowchart showing an exemplary method for producing a solid electrolyte member.

Embodiment 4 will be described below. The same description as those of the above Embodiments 1 to 3 will be omitted appropriately. FIG. 3 is a flowchart showing an exemplary method for producing a solid electrolyte member.

The method for producing a solid electrolyte member includes Step S301 of removing the organic solvent from the solid electrolyte composition according to the above Embodiment 1. The solid electrolyte member is a member including a solid electrolyte material having ion-binding properties. The solid electrolyte member may for example be a member such as a solid electrolyte layer or a solid electrolyte membrane including a solid electrolyte material having ion-binding properties, or an electrode layer including a solid electrolyte material having ion-binding properties.

By removing, from a solid electrolyte composition including a solid electrolyte material having ion-binding properties and an organic solvent, the organic solvent, it is possible for example to produce a homogeneous solid electrolyte membrane. Consequently, the solid electrolyte member can have a high lithium ion conductivity.

In Step S301, the organic solvent is removed from the solid electrolyte composition. At this time, the organic solvent may be removed by drying under reduced pressure. The solid electrolyte composition before removal of the organic solvent is fluid and accordingly excellent in formability, and thus can form, for example, a coating film having a uniform thickness. Drying such a coating film allows to easily obtain, for example, a dense solid electrolyte membrane having reduced pinholes, irregularities, and the like.

Drying under reduced pressure indicates removal of an organic solvent from a solid electrolyte composition in an atmosphere of a pressure lower than atmospheric pressure. The atmosphere of a pressure lower than atmospheric pressure may for example be −0.01 MPa or less as a gauge pressure. In drying under reduced pressure, the solid electrolyte composition or the solid electrolyte member may be heated to, for example, 50° C. or more and 250° C. or less. The organic solvent may be removed by vacuum drying. Vacuum drying indicates removal of an organic solvent from a solid electrolyte composition for example at a vapor pressure or lower at a temperature 20° C. lower than the boiling point of the organic solvent. The removal of the organic solvent can be confirmed by, for example, Fourier transform infrared spectroscopy (FT-IR), X-ray photoelectron spectroscopy (XPS), gas chromatography (GC), or gas chromatography-mass spectrometry (GC/MS). Note that the solid electrolyte material after drying only needs to have ionic conductivity, and the organic solvent does not need to be completely removed.

Examples

The details of the present disclosure will be described below using samples.

(Sample 1)

An amount of 2 g of powdered $Li_3YBr_2Cl_4$ (hereinafter referred to as LYBC) was weighed and put into a commercial glass sample vial. An amount of 4.4 g of o-chlorotoluene and an amount of 0.23 g of cumene were weighed and added to this sample vial. Stirring and mixing were performed with a homogenizer (manufactured by AS ONE Corporation) to prepare a solid electrolyte composition. The ratio of the weight of solids to the weight of the solid electrolyte composition was 30 weight %. The ratio of the weight of o-chlorotoluene to the total weight of the organic solvent was 95 weight %.

As a result of observation on the solid electrolyte composition, no separation was confirmed between the solids and the solvent and a favorable dispersibility was exhibited. The solid electrolyte composition was allowed to stand, and its state was observed one day later to exhibit no particularly remarkable change.

(Evaluation of Dispersion Stability)

An amount of 2 g of the solid electrolyte composition according to Sample 1 was weighed and put into another sample vial. The sample vial was allowed to stand for 3 hours. Then, 1 g of an upper layer of the solid electrolyte composition was taken out and the concentration of solids was measured. In the similar manner, 1 g of a lower layer of the solid electrolyte composition was taken out and the concentration of solids was measured. Further, the difference was calculated between the concentration of the solids of the upper layer and the concentration of the solids of the lower layer. For the measurements of the concentrations of the solids of the upper layer and the lower layer in the sample vial, a heating dry type moisture meter (manufactured by A&D Company, Limited) was used. The results are shown in Table 1.

(Sample 2)

An amount of 2 g of powdered LYBC was weighed and put into a commercial glass sample vial. An amount of 3.55 g of p-chlorotoluene was weighed and added to the sample vial. Stirring and mixing were performed with a spatula and thus a mixture was prepared.

An amount of 2 g of a hydrogenated styrenic thermoplastic elastomer (Tuftec, manufactured by Asahi Kasei Corporation) was weighed and put into another sample vial. An amount of 38 g of p-chlorotoluene was weighed and added to the sample vial. On a hot plate set at 80° C., stirring for dissolution was performed with a magnetic stirrer, and thus an organic binder solution having a concentration of 5 weight % was prepared.

An amount of 1.2 g of the organic binder solution was weighed and added to the sample vial in which the mixture was contained. Stirring and mixing were performed in the similar manner to that in Sample 1. Further, an amount of 0.047 g of tetralin was weighed and added to the sample vial. Stirring and mixing were performed in the similar manner to that in Sample 1 and thus a solid electrolyte composition was prepared. The ratio of the weight of solids to the weight of the solid electrolyte composition was 30 weight %. The ratio of the weight of p-chlorotoluene to the total weight of the organic solvent was 99 weight %.

As a result of observation on the solid electrolyte composition, no separation was confirmed between the solids and the solvent and a favorable dispersibility was exhibited. The solid electrolyte composition was allowed to stand, and its state was observed one day later to exhibit no particularly remarkable change. The dispersion stability was evaluated in the similar manner to that in Sample 1. The results are shown in Table 1.

(Evaluation of Viscosity)

With respect to the solid electrolyte composition according to Sample 2, the viscosity of the solid electrolyte composition immediately after preparation and the viscosity of the solid electrolyte composition after standing for one day were measured. For the measurements of the viscosity, a cone-plate type viscoelasticity measuring apparatus (HAAKE MARS, manufactured by Thermo Fisher Scientific Inc.) was used. The solid electrolyte composition was stirred with a spatula before the measurements. The viscosity at a shear velocity of 10/sec was measured. The results are shown in Table 1.

(Sample 3)

A solid electrolyte composition was prepared in the same manner as that in Sample 2 except that 3.46 g of p-chlorotoluene was weighed and 0.14 g of tetralin was weighed.

(Sample 4)

A solid electrolyte composition was prepared in the same manner as that in Sample 2 except that 1.23 g of p-chlorotoluene was weighed and 2.37 g of tetralin was weighed.

(Sample 5)

A solid electrolyte composition was prepared in the same manner as that in Sample 2 except that 0.28 g of p-chlorotoluene was weighed and 3.32 g of tetralin was weighed.

(Sample 6)

A solid electrolyte composition was prepared in the same manner as that in Sample 2 except that 0.47 g of p-chlorotoluene was weighed and 3.12 g of tetralin was weighed.

(Sample 7)

A solid electrolyte composition was prepared in the same manner as that in Sample 2 except that xylene was used instead of tetralin.

(Sample 8)

A solid electrolyte composition was prepared in the same manner as that in Sample 3 except that xylene was used instead of tetralin.

(Sample 9)

A solid electrolyte composition was prepared in the same manner as that in Sample 8 except that 2.42 g of p-chlorotoluene was weighed and 1.19 g of xylene was weighed.

(Sample 10)

A solid electrolyte composition was prepared in the same manner as that in Sample 2 except that anisole was used instead of tetralin.

(Sample 11)

A solid electrolyte composition was prepared in the same manner as that in Sample 2 except that 3.6 g of p-chlorotoluene was weighed and tetralin was not used.

Table 1 shows the measurement results of the concentration of the solids and the viscosity of the solid electrolyte compositions according to the samples.

TABLE 1

| | Organic solvent | Skeletal structure | Functional group | Ratio (wt %) | Concentration of solids (%) | | | Viscosity (Pa · s) | |
| | | | | | Upper layer | Lower layer | Concentration difference | Immediately after preparation | after one day |
|---|---|---|---|---|---|---|---|---|---|
| Sample 1 | p-Chlorotoluene | Aromatic | Chloro group | 95 | 29.32 | 30.85 | 1.53 | — | — |
| | Cumene | Aromatic | — | 5 | | | | | |
| Sample 2 | p-Chlorotoluene | Aromatic | Chloro group | 99 | 29.47 | 31.95 | 2.48 | 1.20 | 1.07 |
| | Tetralin | Aromatic | — | 1 | | | | | |
| Sample 3 | p-Chlorotoluene | Aromatic | Chloro group | 97 | 28.71 | 32.03 | 3.32 | 0.955 | 0.814 |
| | Tetralin | Aromatic | — | 3 | | | | | |
| Sample 4 | p-Chlorotoluene | Aromatic | Chloro group | 50 | 25.87 | 34.11 | 8.24 | 0.281 | 0.247 |
| | Tetralin | Aromatic | — | 50 | | | | | |
| Sample 5 | p-Chlorotoluene | Aromatic | Chloro group | 30 | 24.22 | 36.74 | 12.52 | 0.291 | 0.257 |
| | Tetralin | Aromatic | — | 70 | | | | | |
| Sample 6 | p-Chlorotoluene | Aromatic | Chloro group | 10 | 23.51 | 36.93 | 13.42 | 0.247 | 0.233 |
| | Tetralin | Aromatic | — | 90 | | | | | |
| Sample 7 | p-Chlorotoluene | Aromatic | Chloro group | 99 | 29.38 | 30.55 | 1.17 | 0.961 | 0.881 |
| | Xylene | Aromatic | — | 1 | | | | | |
| Sample 8 | p-Chlorotoluene | Aromatic | Chloro group | 97 | 28.08 | 31.32 | 3.24 | 0.848 | 0.681 |
| | Xylene | Aromatic | — | 3 | | | | | |
| Sample 9 | p-Chlorotoluene | Aromatic | Chloro group | 75 | 26.68 | 33.41 | 6.73 | 0.494 | 0.524 |
| | Xylene | Aromatic | — | 25 | | | | | |
| Sample 10 | p-Chlorotoluene | Aromatic | Chloro group | 99 | 28.98 | 31.58 | 2.60 | 0.702 | 0.753 |
| | Anisole | Aromatic | Ether group | 1 | | | | | |
| Sample 11 | p-Chlorotoluene | Aromatic | Chloro group | 100 | — | — | — | 0.354 | 288 |

The solid electrolyte compositions according to Samples 1 to 10 exhibited an excellent dispersion stability and an excellent flow stability. In contrast, the solid electrolyte composition according to Sample 11 was allowed to stand, and as a result of observation on its state one day later, the solid electrolyte composition increased in viscosity and was in a solid state.

INDUSTRIAL APPLICABILITY

The solid electrolyte composition according to the present disclosure can be used, for example, for producing all-solid-state lithium secondary batteries.

What is claimed is:

1. A solid electrolyte composition comprising:
a solid electrolyte material having ion-binding properties; and
an organic solvent, wherein:
the organic solvent includes a first organic solvent and a second organic solvent,
the first organic solvent is a halogen-group-containing compound,
the second organic solvent is at least one selected from the group consisting of an ether-group-containing compound and a hydrocarbon, and
the solid electrolyte material includes a material represented by a compositional formula $Li_aMe_bY_cX_6$, where X is at least one selected from the group consisting of Cl, Br, and I, m is the valence of Me, $a+mb+3c=6$, $b>0$, $c>0$, and Me is at least one selected from the group consisting of metalloid elements and metal elements other than Li and Y.

2. The solid electrolyte composition according to claim 1, wherein
the solid electrolyte material is free of a sulfur element.

3. The solid electrolyte composition according to claim 1, further comprising
an organic binder.

4. The solid electrolyte composition according to claim 1, wherein
the solid electrolyte material has lithium ion conductivity, and
Me is at least one selected from the group consisting of Mg, Ca, Sr, Ba, Zn, Sn, Al, Sc, Ga, Bi, Sb, Zr, Hf, Ti, Ta, Nb, W, Gd, Tb, and Sm.

5. The solid electrolyte composition according to claim 1, wherein

Me is at least one selected from the group consisting of Gd, Ca, and Zr, and Y.

6. The solid electrolyte composition according to claim 5, wherein
the solid electrolyte material includes at least one selected from the group consisting of a material where Me is Ca and Gd and X is Cl and Br and a material where Me is Zr and X is Cl.

7. The solid electrolyte composition according to claim 6, wherein
the solid electrolyte material includes at least one selected from the group consisting of $Li_{2.8}Ca_{0.1}Y_{0.5}Gd_{0.5}Br_2Cl_4$ and $Li_{2.5}Y_{0.5}Zr_{0.5}Cl_6$.

8. The solid electrolyte composition according to claim 1, wherein
a ratio of a weight of the halogen-group-containing compound to a total weight of the organic solvent is 10 weight % or more.

9. The solid electrolyte composition according to claim 1, wherein
at least one of the first organic solvent or the second organic solvent has a cyclic structure.

10. The solid electrolyte composition according to claim 9, wherein
at least one of the first organic solvent or the second organic solvent includes an aromatic compound.

11. The solid electrolyte composition according to claim 1, wherein
the halogen-group-containing compound includes at least one selected from the group consisting of 1,2,4-trichlorobenzene, chlorobenzene, 2,4-dichlorotoluene, o-chlorotoluene, 1,3-dichlorobenzene, p-chlorotoluene, 1,2-dichlorobenzene, 1,4-dichlorobutane, and 3,4-dichlorotoluene.

12. The solid electrolyte composition according to claim 1, wherein
the at least one selected from the group consisting of the ether-group-containing compound and the hydrocarbon includes at least one selected from the group consisting of tetralin, ethylbenzene, mesitylene, pseudocumene, xylene, cumene, dibutyl ether, and anisole.

13. The solid electrolyte composition according to claim 1, further comprising
an active material.

* * * * *